United States Patent [19]

Schwartz

[11] Patent Number: 4,985,921
[45] Date of Patent: Jan. 15, 1991

[54] PORTABLE DATA CARRYING DEVICE

[75] Inventor: Hermann Schwartz, Pfäffikon, Switzerland

[73] Assignee: SPA Syspatronic AG, Zug, Switzerland

[21] Appl. No.: 333,646

[22] Filed: Apr. 5, 1989

[30] Foreign Application Priority Data

Apr. 11, 1988 [CH] Switzerland .................. 01323/88

[51] Int. Cl.$^5$ .............................................. H04L 9/00
[52] U.S. Cl. ........................................ 380/24; 235/380
[58] Field of Search ............... 380/24; 235/380, 382.5

[56] References Cited

U.S. PATENT DOCUMENTS

| | | | |
|---|---|---|---|
| 4,453,074 | 6/1984 | Weinstein | 380/24 |
| 4,575,621 | 3/1986 | Dreifus | 380/24 |
| 4,799,061 | 1/1989 | Abraham et al. | 380/24 |
| 4,823,388 | 4/1989 | Mizutani et al. | 380/24 |
| 4,827,512 | 5/1989 | Hirokawa et al. | 380/24 |

Primary Examiner—Thomas H. Tarcza
Assistant Examiner—David Cain

[57] ABSTRACT

With portable data carrying devices, which are intended for the required connection (for example by means of contacts 9) to an external read/write unit in a data exchange system and which contain besides a control unit (2) an additional data memory (5) (both implemented as integrated circuits), a high level of security should be achieved against access to the stored data and manipulations without authorization. For this purpose entry to the additional data memory (5) from the control unit (2) is protected. Various possibilities are specified such as access coding, cryptographic circuit means and methods or secret microcodes. The data carrying device (1) can be implemented with two or more separate integrated circuit components interconnected by a multiple conductor strip (3) (multi-chip), or with all functional units integrated on a common carrier (single chip).

7 Claims, 1 Drawing Sheet

PORTABLE DATA CARRYING DEVICE

BACKGROUND OF THE INVENTION

The invention consists of a portable data carrying device containing a control unit and an additional data memory, each of which is implemented as a integrated circuit. The control unit is provided with means for making connection with an external read/write unit.

Data exchange and data processing systems with a multiple of such portable data carrying devices are well known. The data carrying devices are interconnected as needed for individual uses with a read/write unit in order to communicate With the system. The data carrying devices of the referenced type, which are equipped with a control unit in addition to a sufficient memory capacity, make possible not only an interactive data and signal exchange with the system, but also decentralized data processing and storage in the individual "intelligent" data carrying devices. Such data carrying devices result in extremely versatile and highly developed application possibilities. Such data carrying devices are typically put to use in card form (in credit card format with embedded integrated circuit architecture (so-called "chip cards"). Accordingly, although the data carriers are predominantly referred to hereinafter as "cards", other embodiments should nonetheless not be excluded.

In practically all applications of such data exchange systems one of the most important prerequisites is the security against manipulation and misuse or unauthorized access to the stored and transmitted information, indeed with the "fixed" system components as well as the transportable data carriers. High security requirements exist for the latter in particular on account of their wide distribution (possibility of loss or theft), but also—with "built-in intelligence"—on account of the voluminous stored data therein as well as the stored electronic encoding, as these are necessary for the protected data communication with read/write units (identification and authentication functions).

SUMMARY OF THE INVENTION

Accordingly an object of the foregoing invention is the protection of a portable data carrier of the foregoing type against access and decoding or correspondingly interpretation of the relevant safeguarded data and information stored therein by unauthorized third parties. This object is achieved according to the present invention in that in the referenced data carrying device entry to the additional data memory by the control unit is protected. The protected entry is permitted to be accomplished—as described further below —in various manners through integrated cryptographic circuit means or methods. In this manner improper access to the individual data carrying devices is effectively prevented.

Specially adapted variations of the invention are disclosed. It is to be particularly noted that the invention is employed independently of whether the integrated circuity of a data carrying device ("card") is split betWeen two or more components connected by conductors or is combined on a single carrier (so-called multi-chip—or single chip configurations). The invention therefore makes possible the extension of the memory capacity of additional chips as well as the application of complex chips with the preservation of the "internal" security of the data carrying device.

BRIEF DESCRIPTION OF THE DRAWINGS

Further features of the invention can be derived from the various embodiments in the following description in combination With the drawings.

DESCRIPTION OF THE PREFERRED EMBODIMENTS

FIGS. 1-4 are schematic illustrations of the data carrying cards, in particular plastic cards with embedded integrated semi-conductor circuits ("chips"), wherein the latter are illustrated greatly enlarged and simplified in relation to the card format with the circuitry or, correspondingly, functional areas arranged thereon. It should be understood that the layout of these circuits—extent and design of the individual regions—can be varied according to each application.

Figure 1:
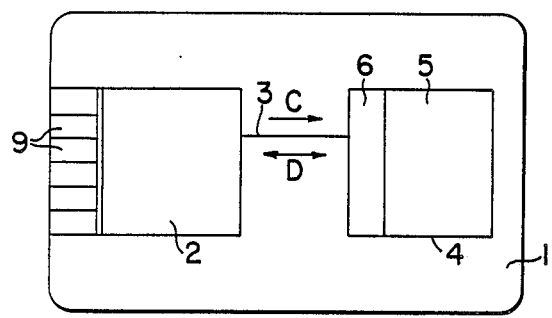
FIG. 1 illustrates a portable data carrying device in accordance with the present invention with a control unit and a data memory requiring an access code.

In FIG. 1 a plastic card is illustrated as a data carrying device in which two integrated semi-conductor - circuit components ("chips") 2 and 4 are set. The component 2 comprises the control unit of the data carrying device and is connected to an external contact 9 of the card 1 for the purpose of connecting to an external (not illustrated) read/write unit of the data exchange system. The connections for the external unit can also be produced in other manners than the galvanized contact, for example, by known means with an inductive coupling and so forth. The control unit 2 preferably comprises a microprocessor with a computer and RAM - and ROM-storage areas as well as additionally a data memory region. An additional data memory 5 exists on the second component 4. The connection between the two components 2 and 4 is produced by means of a multiple conductor strip 3. For technical assembly reasons, it may be useful to combine the components 2 and 4 with the conductor strip 3 and if necessary the external contact 9 into a common module for the construction in the plastic card 1.

An external connection to the control unit 2 can only be made by means of the contact 9 so that an exchange of sensitive data between the card and the system in a known fashion can only come about after successful authentication and identification, which functions are participated in by the control unit. The data exchange is produced also however Within the card between the components 2 and 4 by however within the card between the components 2 and 4 by means of the conductor strip 3. In order to prevent manipulation and unauthorized access to the data memory 5, entry to this memory is protected by the control unit 2. For example according to FIG. 1, an access code region 6 is associated with the data memory 5 for this purpose. In this manner the memory is accessible only by means of a code signal C which is produced by the control unit 2, that is, data exchange D between the components 2 and 4 is only possible after successful decoding of the code region 6. Also, the data exchange within the component 2 between the control unit and a data memory existing there is produced in a similarly protected manner, although not further illustrated. Such protected data exchange processes are produced within the data carrying device 1 with a certain degree of self-sufficiency without participation of external system parts (naturally apart from the current supplied over the contacts 9). The access in particular to the sensitive data in the data memory 5 is thereby protected by means of a barrier which can only be overcome by means of key codes (key lock) employed within the card. In this manner the security can substantially be enhanced so that in the microprocessor of the control unit 2 new access codes can always be generated, for example after each successful access to the additional data memory. memories). The implementation of the additional memory 5 is possible as a serial memory with comparative logic and with a minimum number of connecting conductors 3 between the components 2 and 4.

Figure 2:
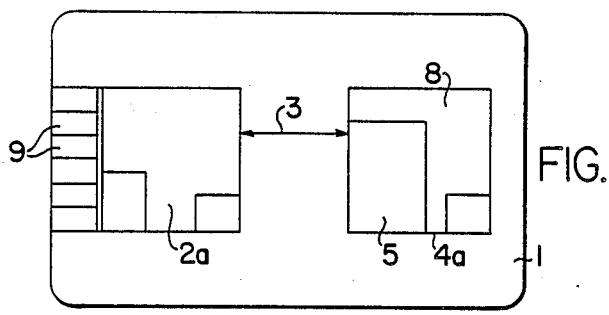
FIG. 2 illustrates another embodiment of the portable data carrying device with separate microprocessors for encryption of data exchanges.

In the embodiment according to FIG. 2, the general construction of the data carrying card 1 with the integrated circuit components 2a, 4a interconnected by means of the conductor strip 3 is the same as in FIG. 1. The control unit 2a connected with the external contacts 9 similarly comprises a microprocessor and a data memory region. On the other hand, the component 4a contains besides the additional memory 5 likewise a microprocessor 8 Whereby still further possibilities with respect to applications and security are achieved. With the help of a microprocessor 8 it is possible not only to secure entry to the data memory 5 from the control unit 2 as in FIG. 1 and with it the unauthorized reading of data from the memory 5, but also beyond this to secure the entire data exchange over the conductors 3, that is, to accomplish this in coded or decoded form. HoWever, the double-pass entry system is only possible after a successful cryptographic authentication from the opposite pas which again is only produced, "within the card", that is, without participation of external system parts.

Figure 3:
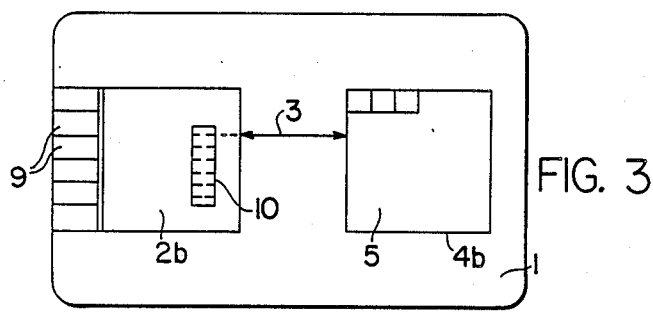
FIG. 3 illustrates another embodiment of the portable data carrying device which utilizes a secret microcode to secure data exchange.

The general construction in the example according to FIG. 3 with a control unit 2b and an additional data memory 4b in the form of separate integrated circuits corresponds again to the foregoing examples. A protected entry to the additional data memory 5 is realized in this embodiment again in another manner, namely in that the microcode of the control unit 2b, designated 10, is secret. Of course, a well known microprocessor can be employed in the control unit 2b and this microprocessor can be based upon an "uncommon" microcode 10 only known to the manufacturer and therefore secret. In this manner an unauthorized access to the data stored in the data carrier or correspondingly a decoding of the information exchanged over the conductors 3 is rendered impossible, even if there was success in getting through the multiple conductor strip 3.

Figure 4:
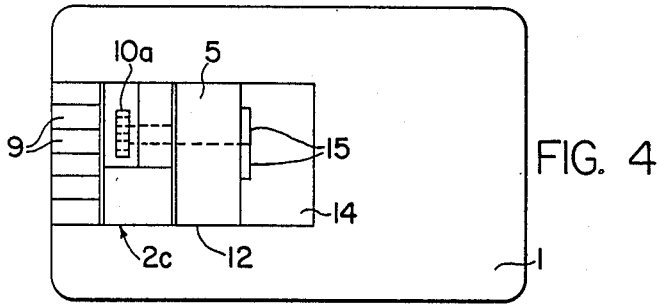
FIG. 4 illustrates still a further embodiment of the portable data carrying device utilizing a microcode within a single chip to secure data exchange.

In contrast to the above described embodiments, the data carrying device or correspondingly the plastic card 1 according to FIG. 4 contains one individual semi-conductor component 12, on which the control unit 2c, the additional data memory 5 as well as further circuit regions are in total implemented in an integrated circuit configuration. In a manner similar to the example according to FIG. 3, the microcode 10a in the microprocessor of the control unit 2c is secret so that entry to the additional data memory 5 is again protected ("mechanical" access on the conductors between the regions of the integrated circuit on one and the same carrier would naturally however be considerably more difficult than on the conductors 3 Which are laid within the plastic card 1 or correspondingly Within a module Which consists of the two separate components 2 and 4).

With the computer in the microprocessor of the control unit 2c there exists further an additional computer 14 in combination With registers 15 which are likewise positioned on the carrier 12. As indicated the registers 15 are likewise coordinated With the secret microcodes 10a of the control unit 2c, that is, the signal exchange between the control unit 2c and the additional computer 14 is produced likewise on the basis of the secret codes. One such additional calculator 14 makes possible the execution of especially highly developed cryptographic methods within the portable data carrying device, that is, without requiring external calculating capacity and thereby particular data exchanges with external system parts. This means that the application of the secret microcodes 10a remains restricted to the integrated circuits of the single carrier 12 in the data carrying device whereby high level security against manipulation and unauthorized access is achieved.

What is claimed is:

1. A portable data carrying device comprising a control unit and an additional data memory which are each implemented as integrated circuits, wherein the control unit is provided with means for placing it in communication with an external read/write device characterized in that entry into the additional data memory (5) by the control unit (2) is protected by coding means which is in the carrying device and is operative to permit entry into the additional data memory (5) without participation of system parts external to the carrying device.

2. A portable data carrying device according to claim 1 characterized in that the data memory (5) contains an access code region and the code means includes means within the control unit (2) for producing a code signal (C) for entry to the data memory through the access code region.

3. A portable data carrying device according to claim 1, characterized in that the code means includes a processor (8) associated with the data memory (5) for a secure (coded or decoded) data exchange with the control unit (2a).

4. A portable data carrying device according to claim 1, characterized in that the code means includes means within the control unit (2b) for producing a secret microcode for communications between the control unit and the data memory.

5. A portable data carrying device according to claim 4, characterized in that an additional computer (14) is established in combination with the computer of the control unit (2c), the additional computer (14) having a register (15) coordinated with the microcode (10a) of the control unit (2c).

6. A portable data carrying device according to claim 1 characterized in that the control unit and the additional data memory are implemented as separate integrated circuits (2, 4) which are placed in communication with one another by means of a multiple conductor strip (3) within the data carrying device (1).

7. A portable data carrying device according to claim 1, characterized in that the control unit (2), the additional data memory (5) together with further regions (6, 8, 14, 15) in total are implemented in a totally integrated circuit construction on the same carrier (12).

* * * * *

(12) EX PARTE REEXAMINATION CERTIFICATE (6488th)
United States Patent
Schwartz

(10) Number: US 4,985,921 C1
(45) Certificate Issued: Oct. 28, 2008

(54) PORTABLE DATA CARRYING DEVICE

(75) Inventor: Hermann Schwartz, Pfäffikon (CH)

(73) Assignee: SPA Syspatronic AG, Zug (CH)

Reexamination Request:
No. 90/007,952, Feb. 28, 2006

Reexamination Certificate for:
Patent No.: 4,985,921
Issued: Jan. 15, 1991
Appl. No.: 07/333,646
Filed: Apr. 5, 1989

(30) Foreign Application Priority Data

Apr. 11, 1988 (CH) .......................... 01323/88

(51) Int. Cl.
*G07F 7/10* (2006.01)

(52) U.S. Cl. .................... 713/193; 235/380; 705/65; 713/159; 713/172

(58) Field of Classification Search .................... None
See application file for complete search history.

(56) References Cited

U.S. PATENT DOCUMENTS

| | | | |
|---|---|---|---|
| 4,105,156 A | 8/1978 | Dethloff | 235/441 |
| 4,218,582 A | 8/1980 | Hellman et al. | 380/30 |
| 4,278,837 A | 7/1981 | Best | 713/190 |
| 4,453,074 A | 6/1984 | Weinstein | 705/66 |
| 4,513,389 A | 4/1985 | Devchoudhury | 364/900 |
| 4,575,621 A | 3/1986 | Dreifus | 235/380 |
| 4,593,384 A | 6/1986 | Kleijne | 365/228 |
| 4,614,861 A * | 9/1986 | Pavlov et al. | 235/380 |
| 4,689,478 A * | 8/1987 | Hale et al. | 235/380 |
| 4,697,073 A | 9/1987 | Hara | 235/487 |
| 4,734,568 A | 3/1988 | Watanabe | 235/487 |
| 4,799,061 A | 1/1989 | Abraham et al. | 340/5.26 |
| 4,823,388 A | 4/1989 | Mizutani et al. | 705/67 |
| 4,827,512 A | 5/1989 | Hirokawa et al. | 713/191 |
| 4,874,935 A | 10/1989 | Younger | 235/492 |
| 4,982,069 A | 1/1991 | Kayanakis | 235/375 |
| 5,014,311 A | 5/1991 | Schrenk | 380/23 |
| 5,153,581 A | 10/1992 | Hazard | 340/5.8 |

FOREIGN PATENT DOCUMENTS

| | | |
|---|---|---|
| DE | 27 38 113 A1 | 3/1978 |
| DE | 28 43 583 C2 | 5/1979 |
| DE | 36 31 992 C2 | 11/1987 |
| DE | 37 36 190 A1 | 5/1988 |
| EP | 0 152 024 A2 | 8/1985 |
| EP | 0 193 856 A2 | 9/1986 |
| EP | 0 207 320 A1 | 1/1987 |
| EP | 0 218 176 A2 | 4/1987 |
| EP | 0 262 036 A1 | 3/1988 |
| EP | 0 337 185 A2 | 10/1989 |
| FR | 2 592 502 A1 | 7/1987 |
| WO | 87/05420 A1 | 9/1987 |

OTHER PUBLICATIONS

Eckelmann, Peter, "Transputer der 2. Generation", Elektronik. vol. 8, Sep. 4, 1987, pp. 61–70.

Keil, Heinrich, "Mikrocomputer", Siemens Aktiengesellschaft, Feb. 1987, Forward and pp. 210–211.

(Continued)

*Primary Examiner*—Joseph R Pokrzywa

(57) ABSTRACT

With portable data carrying devices, which are intended for the required connection (for example by means of contacts 9) to an external read/write unit in a data exchange system and which contain besides a control unit (2) an additional data memory (5) (both implemented as integrated circuits), a high level of security should be achieved against access to the stored data and manipulations without authorization. For this purpose entry to the additional data memory (5) from the control unit (2) is protected. Various possibilities are specified such as access coding, cryptographic circuit means and methods or secret microcodes. The data carrying device (1) can be implemented with two or more separate integrated circuit components interconnected by a multiple conductor strip (3) (multi-chip), or with all functional units integrated on a common carrier (single chip).

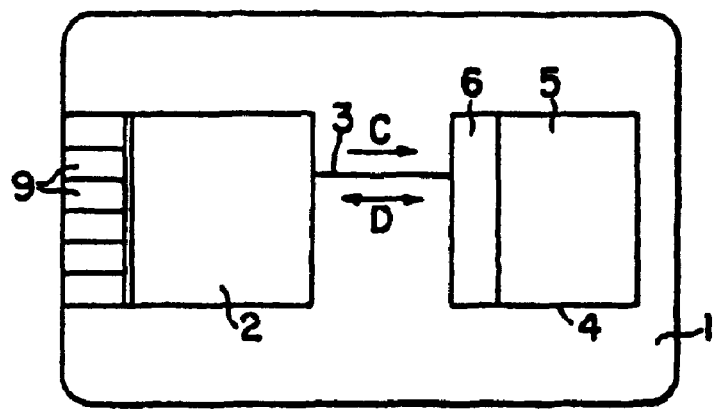

OTHER PUBLICATIONS

Schrenk, H., "Novel Chip Card Concept with the 'Intelligent' SLE 4401K Memory Chip", Telcom Report, Siemens AG, Components Division, Munich, 1986, vol. 9, No. 1, pp. 88–91 (and English translation).

EPO Office Action of Apr. 1, 1993 in Application No. 89 105 509. 7–2207, pp. 1–4 (and English translation).

EPO Office Action of May 3, 1994 in Application No. 89 105 509. 7–2207, pp. 1–4 (and English translation).

Notice of Opposition to EP 0337185, Feb. 23, 1996 by Giesecke & Devrient GmbH, pp. 1–10 (and English translation).

Notice of Opposition to EP 0337185, Feb. 29, 1996 by Siemens Aktiengesellschaft, pp. 1–5 (and English translation).

Interlocutory Decision by the EPO in the Opposition to EP 0337185, Oct. 26, 1998, pp. 1–11 (and English translation).

Appeal by Siemens of EPO Decision in the Opposition to EP 0337185, Feb. 26, 1999, pp. 1–8 (and English translation).

Appeal by SPA Syspatronic of EPO Decision in the Opposition to EP 0337185, Mar. 2, 1999, pp. 1–4 (and English translation).

EPO Board of Appeal Decision in the Opposition to EP 0337185, May 5, 2004, pp. 1–25 (and English translation).

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is cancelled.

New claims 8–13 are added and determined to be patentable.

Claims 2–7 were not reexamined.

8. *A portable data carrying device comprising a control unit and an additional data memory which are each implemented as integrated circuits, wherein the control unit is provided with means for placing it in communication with an external read/write device characterized in that entry into the additional data memory (5) by the control unit (2) is protected by coding means which is in the carrying device and is operative to permit entry into the additional data memory (5) without participation of system parts external to the carrying device, and wherein the control unit and the additional data memory are operative to exchange information in encrypted form.*

9. *A portable data carrying device according to claim 8, characterized in that the data memory contains an access code region and the coding means includes means within the control unit for producing a code signal for entry to the data memory through the access code region.*

10. *A portable data carrying device according to claim 8, characterized in that the coding means includes means within the control unit for producing a secret microcode for communications between the control unit and the data memory.*

11. *A portable data carrying device according to claim 10, characterized in that an additional computer is established in combination with a computer of the control unit, the additional computer having a register coordinated with the microcode of the control unit.*

12. *A portable data carrying device according to claim 8, characterized in that the control unit and the additional data memory are implemented as separate integrated circuits which are placed in communication with one another by means of a multiple conductor strip within the data carrying device.*

13. *A portable data carrying device according to claim 8, characterized in that the control unit, the additional data memory and further regions are implemented collectively in an integrated circuit construction on a single carrier.*

\* \* \* \* \*

(12) EX PARTE REEXAMINATION CERTIFICATE (9418th)
United States Patent
Schwartz

(10) Number: US 4,985,921 C2
(45) Certificate Issued: Nov. 20, 2012

(54) PORTABLE DATA CARRYING DEVICE

(75) Inventor: Hermann Schwartz, Pfäffikon (CH)

(73) Assignee: SPA Syspatronic AG, Zug (CH)

Reexamination Request:
No. 90/011,780, Jul. 14, 2011

Reexamination Certificate for:
Patent No.: 4,985,921
Issued: Jan. 15, 1991
Appl. No.: 07/333,646
Filed: Apr. 5, 1989

Reexamination Certificate C1 4,985,921 issued Oct. 28, 2008

(30) Foreign Application Priority Data

Apr. 11, 1988 (CH) .................................. 01323/88

(51) Int. Cl.
*G07F 7/10* (2006.01)
(52) U.S. Cl. ........ 713/193; 713/159; 713/172; 235/380; 705/65
(58) Field of Classification Search ........................ None
See application file for complete search history.

(56) References Cited

To view the complete listing of prior art documents cited during the proceeding for Reexamination Control Number 90/011,780, please refer to the USPTO's public Patent Application Information Retrieval (PAIR) system under the Display References tab.

*Primary Examiner* — Cameron Saadat

(57) ABSTRACT

With portable data carrying devices, which are intended for the required connection (for example by means of contacts 9) to an external read/write unit in a data exchange system and which contain besides a control unit (2) an additional data memory (5) (both implemented as integrated circuits), a high level of security should be achieved against access to the stored data and manipulations without authorization. For this purpose entry to the additional data memory (5) from the control unit (2) is protected. Various possibilities are specified such as access coding, cryptographic circuit means and methods or secret microcodes. The data carrying device (1) can be implemented with two or more separate integrated circuit components interconnected by a multiple conductor strip (3) (multi-chip), or with all functional units integrated on a common carrier (single chip).

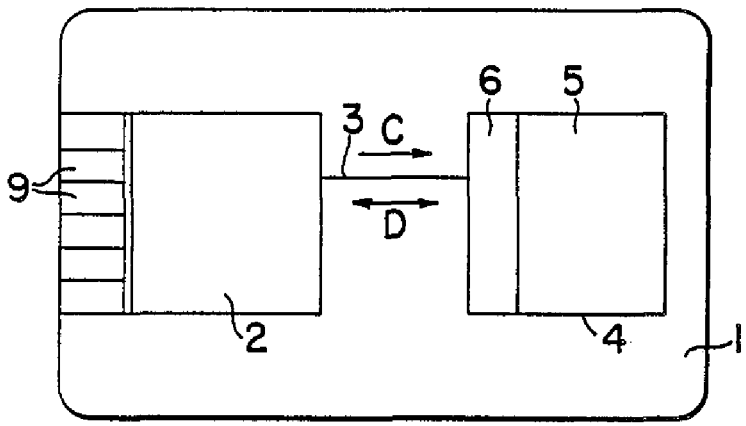

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 2-13 is confirmed.

Claim 1 was previously cancelled.

* * * * *